United States Patent
Clark et al.

(10) Patent No.: US 7,512,742 B2
(45) Date of Patent: Mar. 31, 2009

(54) DATA PROCESSING SYSTEM, CACHE SYSTEM AND METHOD FOR PRECISELY FORMING AN INVALID COHERENCY STATE INDICATING A BROADCAST SCOPE

(75) Inventors: Leo J. Clark, Georgetown, TX (US); Guy L. Guthrie, Austin, TX (US); William J. Starke, Round Rock, TX (US); Jeffrey A. Stuecheli, Austin, TX (US); Derek E. Williams, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 249 days.

(21) Appl. No.: 11/333,615

(22) Filed: Jan. 17, 2006

(65) Prior Publication Data
US 2007/0168618 A1 Jul. 19, 2007

(51) Int. Cl.
*G06F 12/00* (2006.01)
(52) U.S. Cl. .................................................. 711/141
(58) Field of Classification Search .................. 711/141
See application file for complete search history.

(56) References Cited

U.S. PATENT DOCUMENTS

| | | | |
|---|---|---|---|
| 5,852,716 A | 12/1998 | Hagersten | |
| 6,606,676 B1 | 8/2003 | Despande et al. | |
| 7,096,323 B1 | 8/2006 | Conway et al. | |
| 7,162,590 B2 | 1/2007 | Pruvost et al. | |
| 2003/0009637 A1 | 1/2003 | Arimilli et al. | |
| 2003/0097529 A1 | 5/2003 | Arimilli et al. | |
| 2003/0154350 A1 | 8/2003 | Edirisooriya et al. | |
| 2006/0179241 A1* | 8/2006 | Clark et al. | 711/141 |
| 2006/0179249 A1* | 8/2006 | Fields et al. | 711/141 |
| 2006/0179252 A1* | 8/2006 | Cantin et al. | 711/144 |
| 2006/0224833 A1 | 10/2006 | Guthrie et al. | |

OTHER PUBLICATIONS

Patterson, Computer Architecture-A Quantative Approach, 1996, Morgan Kaufmann Publishers, 2nd Edition, p. 75.

* cited by examiner

*Primary Examiner*—Sheng-Jen Tsai
(74) *Attorney, Agent, or Firm*—Casimer K. Salys; Dillon & Yudell LLP (57) ABSTRACT

A cache coherent data processing system includes at least first and second coherency domains. In a first cache memory within the first coherency domain of the data processing system, a memory block is held in a storage location associated with an address tag and a coherency state field. A determination is made if a home system memory assigned an address associated with the memory block is within the first coherency domain. If not, the coherency state field is set to a coherency state that indicates that the address tag is valid, that the storage location does not contain valid data, the first coherency domain does not contain the home system memory, and that, following formation of the coherency state, the memory block is cached outside of the first coherency domain.

17 Claims, 8 Drawing Sheets

DATA PROCESSING SYSTEM, CACHE SYSTEM AND METHOD FOR PRECISELY FORMING AN INVALID COHERENCY STATE INDICATING A BROADCAST SCOPE

CROSS-REFERENCE TO RELATED APPLICATION(S)

The present application is related to the following pending patent applications, which are assigned to the assignee of the present invention and incorporated herein by reference in their entireties:

(1) U.S. patent application Ser. No. 11/140,821; and
(2) U.S. patent application Ser. No. 11/055,305.

BACKGROUND OF THE INVENTION

1. Technical Field

The present invention relates in general to data processing and, in particular, to data processing in a cache coherent data processing system.

2. Description of the Related Art

A conventional symmetric multiprocessor (SMP) computer system, such as a server computer system, includes multiple processing units all coupled to a system interconnect, which typically comprises one or more address, data and control buses. Coupled to the system interconnect is a system memory, which represents the lowest level of volatile memory in the multiprocessor computer system and which generally is accessible for read and write access by all processing units. In order to reduce access latency to instructions and data residing in the system memory, each processing unit is typically further supported by a respective multi-level cache hierarchy, the lower level(s) of which may be shared by one or more processor cores.

Because multiple processor cores may request write access to a same cache line of data and because modified cache lines are not immediately synchronized with system memory, the cache hierarchies of multiprocessor computer systems typically implement a cache coherency protocol to ensure at least a minimum level of coherence among the various processor core's "views" of the contents of system memory. In particular, cache coherency requires, at a minimum, that after a processing unit accesses a copy of a memory block and subsequently accesses an updated copy of the memory block, the processing unit cannot again access the old copy of the memory block.

A cache coherency protocol typically defines a set of coherency states stored in association with the cache lines of each cache hierarchy, as well as a set of coherency messages utilized to communicate the cache state information between cache hierarchies. In a typical implementation, the coherency state information takes the form of the well-known MESI (Modified, Exclusive, Shared, Invalid) protocol or a variant thereof, and the coherency messages indicate a protocol-defined coherency state transition in the cache hierarchy of the requestor and/or the recipients of a memory access request.

In some cache coherency protocols, one or more coherency states are imprecisely formed and/or updated in response to subsequent operations. Consequently, these coherency states may not accurately reflect a system-wide coherency state of the associated memory blocks. The present invention recognizes that the existence of imprecise or inaccurate coherency states, even if not causing coherency errors, can lead to system operations being performed that would otherwise not be required if the imprecise coherency states were reduced or eliminated.

SUMMARY OF THE INVENTION

In view of the foregoing, the present invention provides an improved cache coherent data processing system, cache system and method of data processing in a cache coherent data processing system.

In one embodiment, a cache coherent data processing system includes at least first and second coherency domains. In a first cache memory within the first coherency domain of the data processing system, a memory block is held in a storage location associated with an address tag and a coherency state field. A determination is made if a home system memory assigned an address associated with the memory block is within the first coherency domain. If not, the coherency state field is set to a state that indicates that the address tag is valid, that the storage location does not valid data, the first coherency domain does not contain the home system memory, and that, following formation of the state, the memory block is cached outside of the first coherency domain.

All objects, features, and advantages of the present invention will become apparent in the following detailed written description.

BRIEF DESCRIPTION OF THE DRAWINGS

The novel features believed characteristic of the invention are set forth in the appended claims. However, the invention, as well as a preferred mode of use, will best be understood by reference to the following detailed description of an illustrative embodiment when read in conjunction with the accompanying drawings, wherein:

DETAILED DESCRIPTION OF ILLUSTRATIVE EMBODIMENT

1. Exemplary Data Processing System

Figure 1:
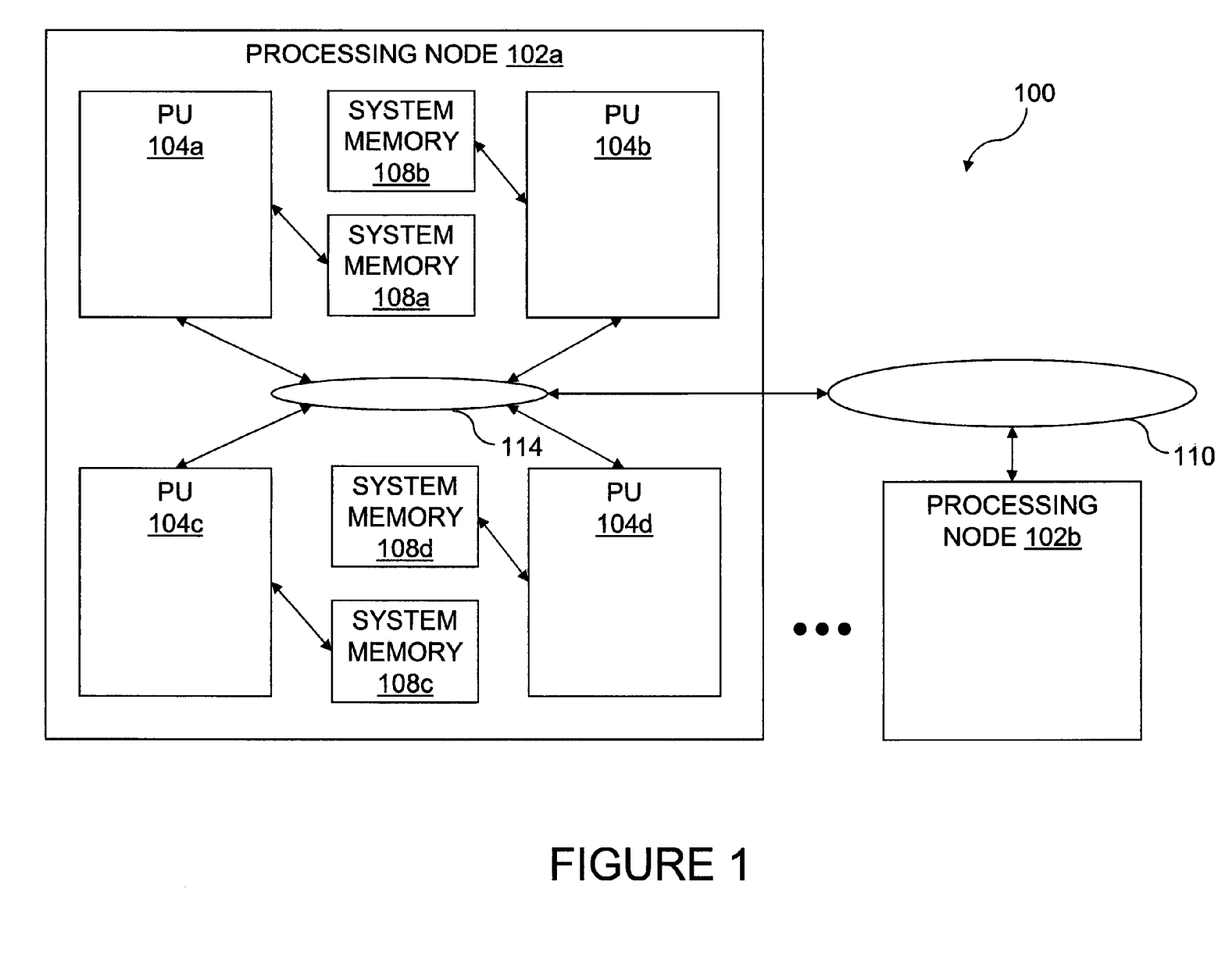
FIG. 1 is a high level block diagram of an exemplary data processing system in accordance with the present invention.

With reference now to the figures and, in particular, with reference to FIG. 1, there is illustrated a high level block diagram of an exemplary embodiment of a cache coherent symmetric multiprocessor (SMP) data processing system in accordance with the present invention. As shown, data processing system 100 includes multiple processing nodes 102*a*, 102*b* for processing data and instructions. Processing nodes 102a, 102b are coupled to a system interconnect 110 for conveying address, data and control information. System interconnect 110 may be implemented, for example, as a bused interconnect, a switched interconnect or a hybrid interconnect.

In the depicted embodiment, each processing node 102 is realized as a multi-chip module (MCM) containing four processing units 104a-104d, each preferably realized as a respective integrated circuit. The processing units 104a-104d within each processing node 102 are coupled for communication by a local interconnect 114, which, like system interconnect 110, may be implemented with one or more buses and/or switches.

The devices coupled to each local interconnect 114 include not only processing units 104, but also one or more system memories 108a-108d. Data and instructions residing in system memories 108 can generally be accessed and modified by a processor core in any processing unit 104 in any processing node 102 of data processing system 100. In alternative embodiments of the invention, one or more system memories 108 can be coupled to system interconnect 110 rather than a local interconnect 114.

Those skilled in the art will appreciate that SMP data processing system 100 can include many additional unillustrated components, such as interconnect bridges, non-volatile storage, ports for connection to networks or attached devices, etc. Because such additional components are not necessary for an understanding of the present invention, they are not illustrated in FIG. 1 or discussed further herein. It should also be understood, however, that the enhancements provided by the present invention are applicable to cache coherent data processing systems of diverse architectures and are in no way limited to the generalized data processing system architecture illustrated in FIG. 1.

Figure 2:
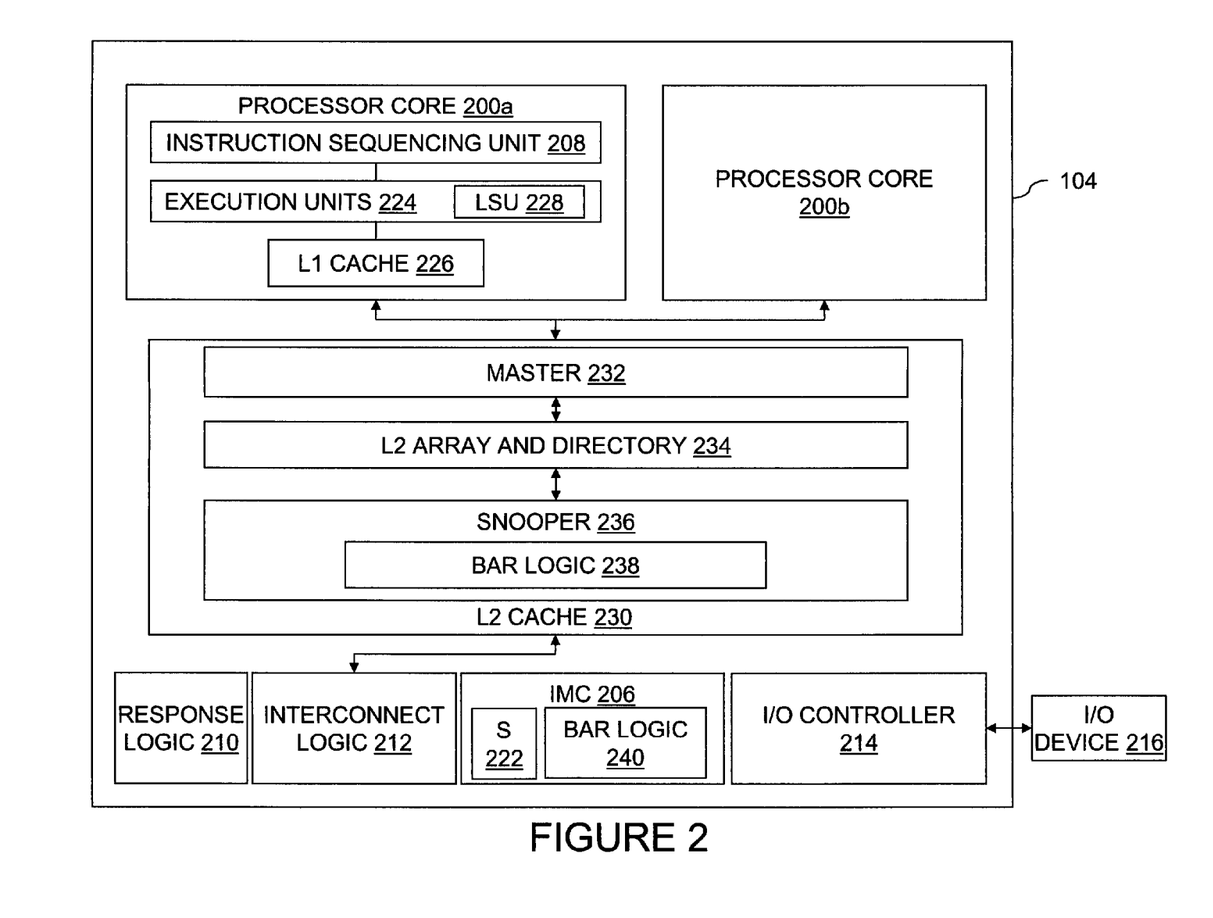
FIG. 2 is a more detailed block diagram of a processing unit in accordance with the present invention.

Referring now to FIG. 2, there is depicted a more detailed block diagram of an exemplary processing unit 104 in accordance with the present invention. In the depicted embodiment, each processing unit 104 includes two processor cores 200a, 200b for independently processing instructions and data. Each processor core 200 includes at least an instruction sequencing unit (ISU) 208 for fetching and ordering instructions for execution and one or more execution units 224 for executing instructions. As discussed further below, execution units 224 preferably include a load-store unit (LSU) 228 for executing memory access instructions that references a memory block or cause the generation of an operation referencing a memory block.

The operation of each processor core 200 is supported by a multi-level volatile memory hierarchy having at its lowest level shared system memories 108a-108d, and at its upper levels one or more levels of cache memory. In the depicted embodiment, each processing unit 104 includes an integrated memory controller (IMC) 206 that controls read and write access to a respective one of the system memories 108a-108d within its processing node 102 in response to requests received from processor cores 200a-200b and operations snooped by a snooper (S) 222 on the local interconnect 114. IMC 206 includes base address register (BAR) logic 240, which includes range registers defining both the addresses for which IMC 206 is responsible and the addresses for which other IMC(s) 206 in the same processing node 102 are responsible.

In the illustrative embodiment, the cache memory hierarchy of processing unit 104 includes a store-through level one (L1) cache 226 within each processor core 200 and a level two (L2) cache 230 shared by all processor cores 200a, 200b of the processing unit 104. L2 cache 230 includes an L2 array and directory 234 and a cache controller comprising a master 232 and a snooper 236. Master 232 initiates transactions on local interconnect 114 and system interconnect 110 and accesses L2 array and directory 234 in response to memory access (and other) requests received from the associated processor cores 200a-200b. Snooper 236 snoops operations on local interconnect 114, provides appropriate responses, and performs any accesses to L2 array and directory 234 required by the operations. Snooper 236 includes BAR logic 238 that, like BAR logic 240, indicates the addresses for which IMCs 206 in the local processing node 102 are responsible.

Although the illustrated cache hierarchy includes only two levels of cache, those skilled in the art will appreciate that alternative embodiments may include additional levels (L3, L4, L5 etc.) of on-chip or off-chip in-line or lookaside cache, which may be fully inclusive, partially inclusive, or non-inclusive of the contents the upper levels of cache.

Each processing unit 104 further includes an instance of response logic 210, which implements a portion of the distributed coherency signaling mechanism that maintains cache coherency within data processing system 100. In addition, each processing unit 104 includes an instance of interconnect logic 212 for selectively forwarding communications between its local interconnect 114 and system interconnect 110. Finally, each processing unit 104 includes an integrated I/O (input/output) controller 214 supporting the attachment of one or more I/O devices, such as I/O device 216. I/O controller 214 may issue operations on local interconnect 114 and/or system interconnect 110 in response to requests by I/O device 216.

Figure 3:
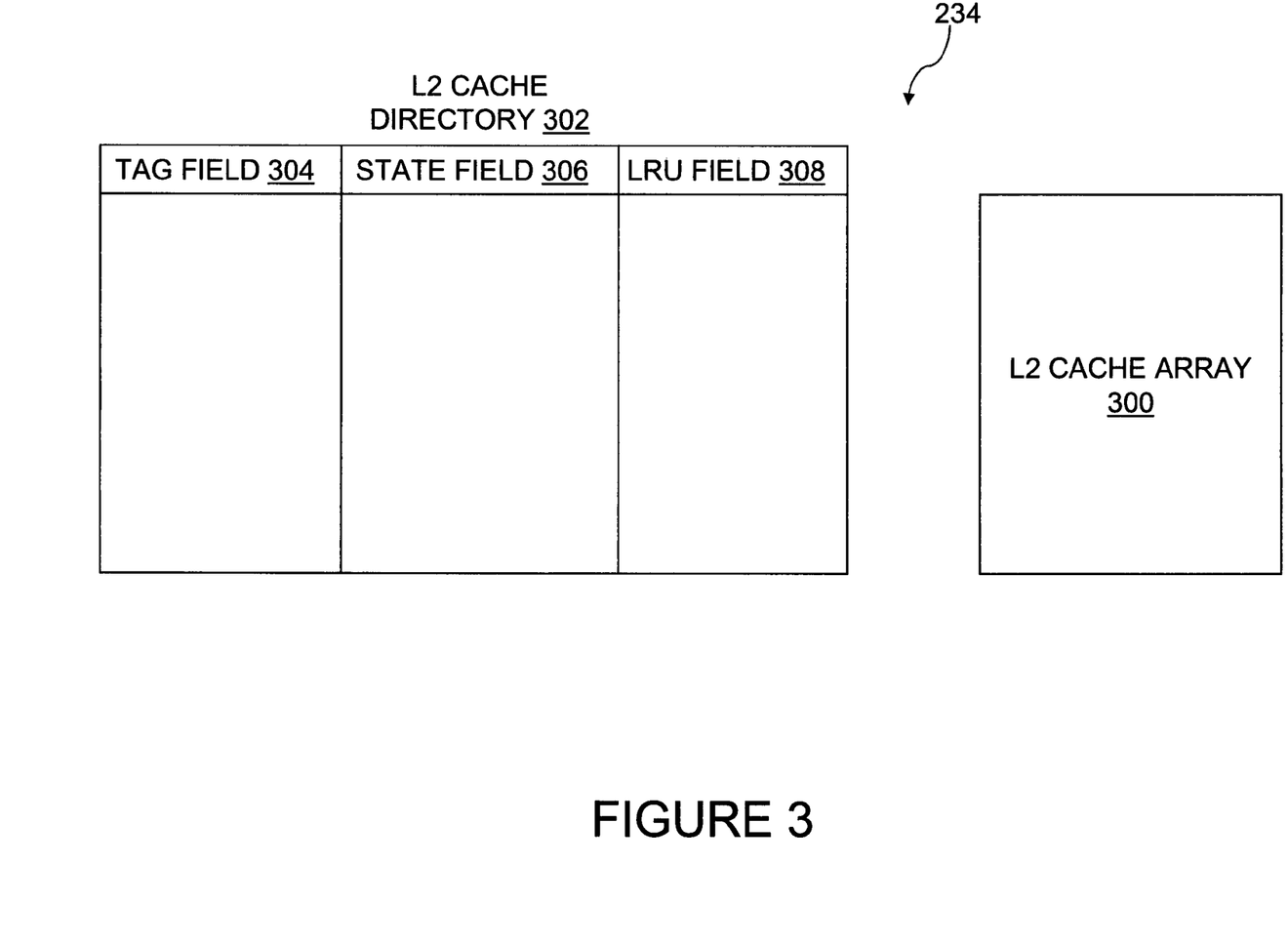
FIG. 3 is a more detailed block diagram of the L2 cache array and directory depicted in FIG. 2.

With reference now to FIG. 3, there is illustrated a more detailed block diagram of an exemplary embodiment of L2 array and directory 234. As illustrated, L2 array and directory 234 includes a set associative L2 cache array 300 and an L2 cache directory 302 of the contents of L2 cache array 300. As in conventional set associative caches, memory locations in system memories 108 are mapped to particular congruence classes within cache arrays 300 utilizing predetermined index bits within the system memory (real) addresses. The particular cache lines stored within cache array 300 are recorded in cache directory 302, which contains one directory entry for each cache line in cache array 300. As understood by those skilled in the art, each directory entry in cache directory 302 comprises at least a tag field 304, which specifies the particular cache line stored in cache array 300 utilizing a tag portion of the corresponding real address, a state field 306, which indicates the coherency state of the cache line, and a LRU (Least Recently Used) field 308 indicating a replacement order for the cache line with respect to other cache lines in the same congruence class.

II. Exemplary Operation

Figure 4:
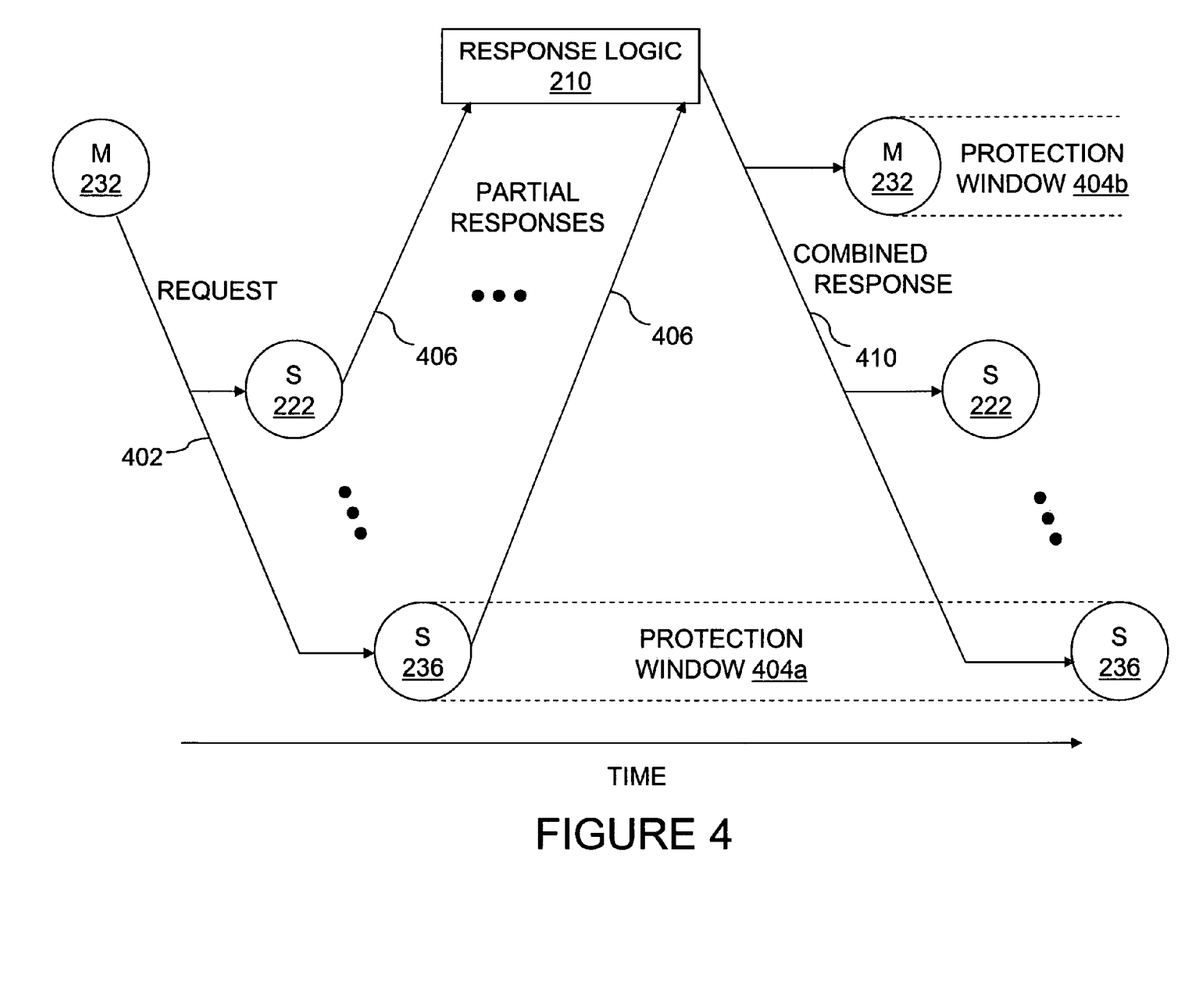
FIG. 4 is a time-space diagram of an exemplary transaction on the system interconnect of the data processing system of FIG. 1.

Referring now to FIG. 4, there is depicted a time-space diagram of an exemplary operation on a local or system interconnect 110, 114 of data processing system 100 of FIG. 1. The operation begins when a master 232 of an L2 cache 230 (or another master, such as an I/O controller 214) issues a request 402 on a local interconnect 114 and/or system interconnect 110. Request 402 preferably includes a transaction type indicating a type of desired access and a resource identifier (e.g., real address) indicating a resource to be accessed by the request. Common types of requests preferably include those set forth below in Table I.

TABLE I

| Request | Description |
| --- | --- |
| READ | Requests a copy of the image of a memory block for query purposes |
| RWITM (Read-With-Intent-To-Modify) | Requests a unique copy of the image of a memory block with the intent to update (modify) it and requires destruction of other copies, if any |
| DCLAIM (Data Claim) | Requests authority to promote an existing query-only copy of memory block to a unique copy with the intent to update (modify) it and requires destruction of other copies, if any |
| DCBZ (Data Cache Block Zero) | Requests authority to create a new unique cached copy of a memory block without regard to its present state and subsequently modify its contents; requires destruction of other copies, if any |
| CASTOUT | Copies the image of a memory block from a higher level of memory to a lower level of memory in preparation for the destruction of the higher level copy |
| KILL | Forces destruction of cached copies, if any, of a memory block not held in the cache hierarchy of the master |
| WRITE | Requests authority to create a new unique copy of a memory block without regard to its present state and immediately copy the image of the memory block from a higher level memory to a lower level memory in preparation for the destruction of the higher level copy |
| PARTIAL WRITE | Requests authority to create a new unique copy of a partial memory block without regard to its present state and immediately copy the image of the partial memory block from a higher level memory to a lower level memory in preparation for the destruction of the higher level copy |

Request 402 is received by the snooper 236 of L2 caches 230, as well as the snoopers 222 of memory controllers 206 (FIG. 1). In general, with some exceptions, the snooper 236 in the same L2 cache 230 as the master 232 of request 402 does not snoop request 402 (i.e., there is generally no self-snooping) because a request 402 is transmitted on local interconnect 114 and/or system interconnect 110 only if the request 402 cannot be serviced internally by a processing unit 104. Each snooper 222, 236 that receives request 402 may provide a respective partial response 406 representing the response of at least that snooper to request 402. A snooper 222 within a memory controller 206 determines the partial response 406 to provide based, for example, whether the snooper 222 is responsible for the request address and whether it has resources available to service the request. A snooper 236 of an L2 cache 230 may determine its partial response 406 based on, for example, the availability of its L2 cache directory 302, the availability of a snoop logic instance within snooper 236 to handle the request, and the coherency state associated with the request address in L2 cache directory 302.

The partial responses of snoopers 222 and 236 are logically combined either in stages or all at once by one or more instances of response logic 210 to determine a system-wide combined response (CR) 410 to request 402. Subject to the scope restrictions discussed below, response logic 210 provides combined response 410 to master 232 and snoopers 222, 236 via its local interconnect 114 and/or system interconnect 110 to indicate the system-wide response (e.g., success, failure, retry, etc.) to request 402. If CR 410 indicates success of request 402, CR 410 may indicate, for example, a data source for a requested memory block, a cache state in which the requested memory block is to be cached by master 232, and whether "cleanup" (e.g., KILL) operations invalidating the requested memory block in one or more L2 caches 230 are required.

In response to receipt of combined response 410, one or more of master 232 and snoopers 222, 236 typically perform one or more operations in order to service request 402. These operations may include supplying data to master 232, invalidating or otherwise updating the coherency state of data cached in one or more L2 caches 230, performing castout operations, writing back data to a system memory 108, etc. If required by request 402, a requested or target memory block may be transmitted to or from master 232 before or after the generation of combined response 410 by response logic 210.

In the following description, the partial response of a snooper 222, 236 to a request and the operations performed by the snooper in response to the request and/or its combined response will be described with reference to whether that snooper is a Highest Point of Coherency (HPC), a Lowest Point of Coherency (LPC), or neither with respect to the request address specified by the request. An LPC is defined herein as a memory device or I/O device that functions as the control point for the repository of a memory block. In the absence of a HPC for the memory block, the LPC controls access to the storage holding the true image of the memory block and has authority to grant or deny requests to generate an additional cached copy of the memory block. For a typical request in the data processing system embodiment of FIGS. 1 and 2, the LPC will be the memory controller 206 for the system memory 108 holding the referenced memory block. An HPC is defined herein as a uniquely identified device that caches a true image of the memory block (which may or may not be consistent with the corresponding memory block at the LPC) and has the authority to grant or deny a request to modify the memory block. Descriptively, the HPC may also provide a copy of the memory block to a requester in response to an operation that does not modify the memory block. Thus, for a typical request in the data processing system embodiment of FIGS. 1 and 2, the HPC, if any, will be an L2 cache 230. Although other indicators may be utilized to designate an HPC for a memory block, a preferred embodiment of the present invention designates the HPC, if any, for a memory block utilizing selected cache coherency state(s) within the L2 cache directory 302 of an L2 cache 230, as described further below with reference to Table II.

Still referring to FIG. 4, the HPC, if any, for a memory block referenced in a request 402, or in the absence of an HPC, the LPC of the memory block, preferably has the responsibility of protecting the transfer of ownership of a memory block in response to a request 402 during a protection window 404a. In the exemplary scenario shown in FIG. 4, the snooper 236 that is the HPC for the memory block specified by the request address of request 402 protects the transfer of ownership of the requested memory block to master 232 during a protection window 404a that extends from the time that snooper 236 determines its partial response 406 until snooper 236 receives combined response 410. During protection window 404a, snooper 236 protects the transfer of ownership by providing partial responses 406 to other requests specifying the same request address that prevent other masters from obtaining ownership until ownership has been successfully transferred to master 232. Master 232 likewise initiates a protection window 404b to protect its ownership of the memory block requested in request 402 following receipt of combined response 410.

Because snoopers 222, 236 all have limited resources for handling the CPU and I/O requests described above, several different levels of partial responses and corresponding CRs are possible. For example, if a snooper 222 within a memory controller 206 that is responsible for a requested memory block has a queue available to handle a request, the snooper 222 may respond with a partial response indicating that it is able to serve as the LPC for the request. If, on the other hand, the snooper 222 has no queue available to handle the request, the snooper 222 may respond with a partial response indicating that is the LPC for the memory block, but is unable to currently service the request.

Similarly, a snooper 236 in an L2 cache 230 may require an available instance of snoop logic and access to L2 cache directory 302 in order to handle a request. Absence of access to either (or both) of these resources results in a partial response (and corresponding CR) signaling a present inability to service the request due to absence of a required resource.

Hereafter, a snooper 222, 236 providing a partial response indicating that the snooper has available all internal resources required to presently service a request, if required, is said to "affirm" the request. For snoopers 236, partial responses affirming a snooped operation preferably indicate the cache state of the requested or target memory block at that snooper 236. A snooper 222, 236 providing a partial response indicating that, the snooper 236 does not have available all internal resources required to presently service the request may be said to be "possibly hidden" or "unable" to service the request. Such a snooper 236 is "possibly hidden" or "unable" to service a request because the snooper 236, due to lack of an available instance of snoop logic or present access to L2 cache directory 302, cannot "affirm" the request in sense defined above and has, from the perspective of other masters 232 and snoopers 222, 236, an unknown coherency state.

III. Data Delivery Domains

Conventional broadcast-based data processing systems handle both cache coherency and data delivery through broadcast communication, which in conventional systems is transmitted on a system interconnect to at least all memory controllers and cache hierarchies in the system. As compared with systems of alternative architectures and like scale, broadcast-based systems tend to offer decreased access latency and better data handling and coherency management of shared memory blocks.

As broadcast-based system scale in size, traffic volume on the system interconnect is multiplied, meaning that system cost rises sharply with system scale as more bandwidth is required for communication over the system interconnect. That is, a system with m processor cores, each having an average traffic volume of n transactions, has a traffic volume of m×n, meaning that traffic volume in broadcast-based systems scales multiplicatively not additively. Beyond the requirement for substantially greater interconnect bandwidth, an increase in system size has the secondary effect of increasing some access latencies. For example, the access latency of read data is limited, in the worst case, by the combined response latency of the furthest away lower level cache holding the requested memory block in a shared coherency state from which the requested data can be sourced.

In order to reduce system interconnect bandwidth requirements and access latencies while still retaining the advantages of a broadcast-based system, multiple L2 caches 230 distributed throughout data processing system 100 are permitted to hold copies of the same memory block in a "special" shared coherency state that permits these caches to supply the memory block to requesting L2 caches 230 using cache-to-cache intervention. In order to implement multiple concurrent and distributed sources for shared memory blocks in an SMP data processing system, such as data processing system 100, two issues must be addressed. First, some rule governing the creation of copies of memory blocks in the "special" shared coherency state alluded to above must be implemented. Second, there must be a rule governing which snooping L2 cache 230, if any, provides a shared memory block to a requesting L2 cache 230, for example, in response to a bus read operation or bus RWITM operation.

According to the present invention, both of these issues are addressed through the implementation of data sourcing domains. In particular, each domain within a SMP data processing system, where a domain is defined to include one or more lower level (e.g., L2) caches that participate in responding to data requests, is permitted to include only one cache hierarchy that holds a particular memory block in the "special" shared coherency state at a time. That cache hierarchy, if present when a bus read-type (e.g., read or RWITM) operation is initiated by a requesting lower level cache in the same domain, is responsible for sourcing the requested memory block to the requesting lower level cache. Although many different domain sizes may be defined, in data processing system 100 of FIG. 1, it is convenient if each processing node 102 (i.e., MCM) is considered a data sourcing domain. One example of such a "special" shared state (i.e., Sr) is described below with reference to Table II.

IV. Coherency Domains

While the implementation of data delivery domains as described above improves data access latency, this enhancement does not address the m×n multiplication of traffic volume as system scale increases. In order to reduce traffic volume while still maintaining a broadcast-based coherency mechanism, preferred embodiments of the present invention additionally implement coherency domains, which like the data delivery domains hereinbefore described, can conveniently (but are not required to be) implemented with each processing node 102 forming a separate coherency domain. Data delivery domains and coherency domains can be, but are not required to be coextensive, and for the purposes of explaining exemplary operation of data processing system 100 will hereafter be assumed to have boundaries defined by processing nodes 102.

The implementation of coherency domains reduces system traffic by limiting inter-domain broadcast communication over system interconnect 110 in cases in which requests can be serviced with participation by fewer than all coherency domains. For example, if processing unit 104a of processing node 102a has a bus read operation to issue, then processing unit 104a may elect to first broadcast the bus read operation to all participants within its own coherency domain (e.g., processing node 102a), but not to participants in other coherency domains (e.g., processing node 102b). A broadcast operation transmitted to only those participants within the same coherency domain as the master of the operation is defined herein as a "local operation". If the local bus read operation can be serviced within the coherency domain of processing unit 104a, then no further broadcast of the bus read operation is performed. If, however, the partial responses and combined response to the local bus read operation indicate that the bus read operation cannot be serviced solely within the coherency domain of processing node 102a, the scope of the broadcast may then be extended to include, in addition to the local coherency domain, one or more additional coherency domains.

In a basic implementation, two broadcast scopes are employed: a "local" scope including only the local coherency domain and a "global" scope including all of the other coherency domains in the SMP data processing system. Thus, an operation that is transmitted to all coherency domains in an SMP data processing system is defined herein as a "global operation". Importantly, regardless of whether local operations or operations of more expansive scope (e.g., global operations) are employed to service operations, cache coherency is maintained across all coherency domains in the SMP data processing system. Examples of local and global operations are described in detail in U.S. patent application Ser. No. 11/055,305, which is incorporated herein by reference in its entirety.

In a preferred embodiment, the scope of an operation is indicated in a bus operation by a local/global scope indicator (signal), which in one embodiment may comprise a 1-bit flag. Forwarding logic 212 within processing units 104 preferably determines whether or not to forward an operation, received via local interconnect 114 onto system interconnect 110 based upon the setting of the local/global scope indicator (signal) in the operation.

In the present description, a coherency domain is referred to the "home" coherency domain (or "home" node) of a memory block if the coherency domain (or processing node) contains the LPC of the memory block.

V. Domain Indicators

Figure 5:
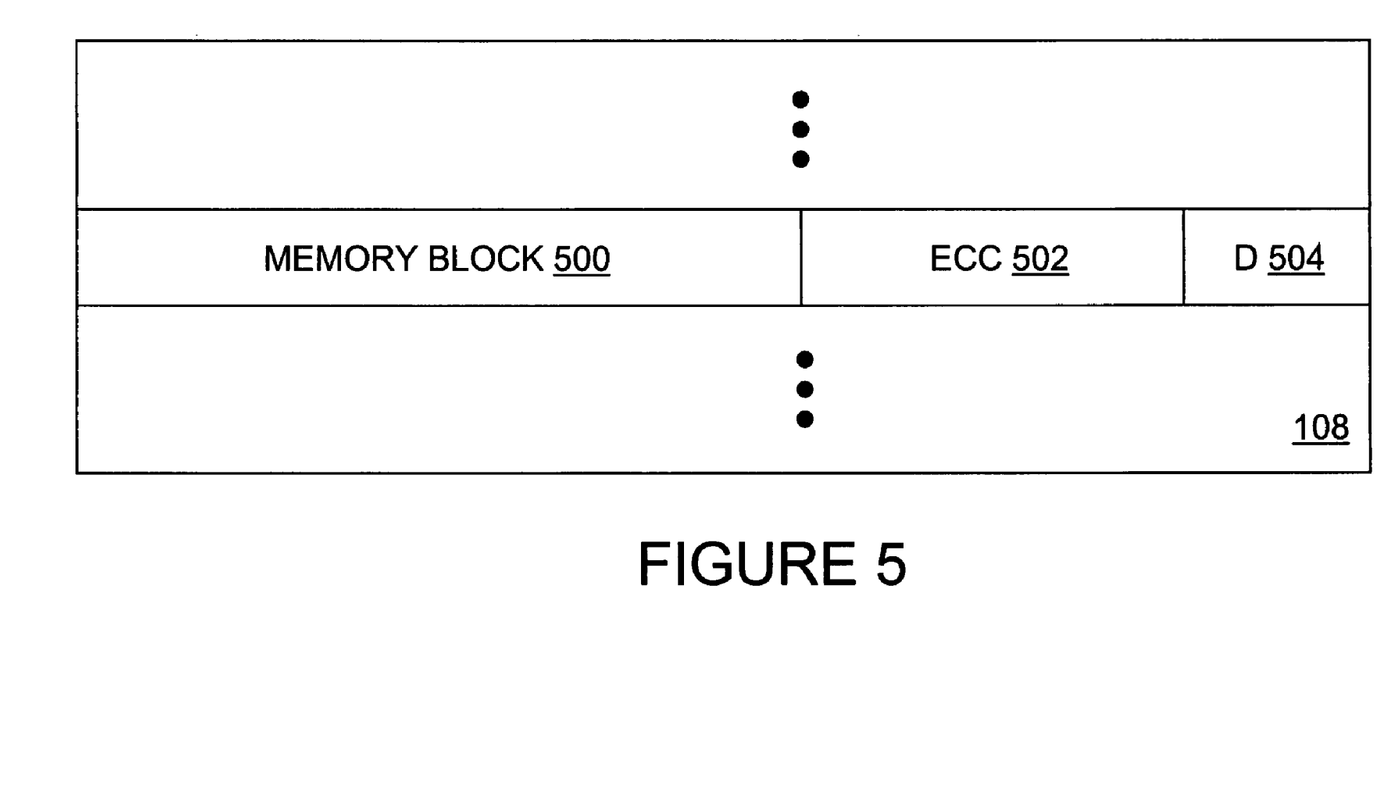
FIG. 5 illustrates a domain indicator in accordance with a preferred embodiment of the present invention.

In order to limit the issuance of unneeded local operations and thereby reduce operational latency and conserve additional bandwidth on local interconnects, the present invention preferably implements a domain indicator per memory block that indicates whether or not a copy of the associated memory block is cached outside of the local coherency domain. For example, FIG. 5 depicts a first exemplary implementation of a domain indicator in accordance with the present invention. As shown in FIG. 5, a system memory 108, which may be implemented in dynamic random access memory (DRAM), stores a plurality of memory blocks 500. System memory 108 stores in association with each memory block 500 an associated error correcting code (ECC) 502 utilized to correct errors, if any, in memory block 500 and a domain indicator 504. Although in some embodiments of the present invention, domain indicator 504 may identify a particular coherency domain (i.e., specify a coherency domain or node ID), it is hereafter assumed that domain indicator 504 is a 1-bit indicator that is set (e.g., to '1' to indicate "local") if the associated memory block 500 is cached, if at all, only within the same coherency domain as the memory controller 206 serving as the LPC for the memory block 500. Domain indicator 504 is reset (e.g., to '0' to indicate "global") otherwise. The setting of domain indicators 504 to indicate "local" may be implemented imprecisely in that a false setting of "global" will not induce any coherency errors, but may cause unneeded global broadcasts of operations.

Memory controllers 206 (and L2 caches 230) that source a memory block in response to an operation preferably transmit the associated domain indicator 504 in conjunction with the requested memory block.

VI. Exemplary Coherency Protocol

The present invention preferably implements a cache coherency protocol designed to leverage the implementation of data delivery and coherency domains as described above. In a preferred embodiment, the cache coherency states within the protocol, in addition to providing (1) an indication of whether a cache is the HPC for a memory block, also indicate (2) whether the cached copy is unique (i.e., is the only cached copy system-wide) among caches at that memory hierarchy level, (3) whether and when the cache can provide a copy of the memory block to a master of a request for the memory block, (4) whether the cached image of the memory block is consistent with the corresponding memory block at the LPC (system memory), and (5) whether another cache in a remote coherency domain (possibly) holds a cache entry having a matching address. These five attributes can be expressed, for example, in an exemplary variant of the well-known MESI (Modified, Exclusive, Shared, Invalid) protocol summarized below in Table II.

TABLE II

| Cache state | HPC? | Unique? | Data source? | Consistent with LPC? | Cached outside local domain? | Legal concurrent states |
|---|---|---|---|---|---|---|
| M | yes | yes | yes, before CR | no | no | I, Ig, Igp, In (& LPC) |
| Me | yes | yes | yes, before CR | yes | no | I, Ig, Igp, In (& LPC) |
| T | yes | unknown | yes, after CR if none provided before CR | no | unknown | Sr, S, I, Ig, Igp, In (& LPC) |
| Tn | yes | unknown | yes, after CR if none provided before CR | no | no | Sr, S, I, Ig, Igp, In (& LPC) |
| Te | yes | unknown | yes, after CR if none provided before CR | yes | unknown | Sr, S, I, Ig, Igp, In (& LPC) |
| Ten | yes | unknown | yes, after CR if none provided before CR | yes | no | Sr, S, I, Ig, Igp, In (& LPC) |
| Sr | no | unknown | yes, before CR | unknown | unknown | T, Tn, Te, Ten, S, I, Ig, Igp, In (& LPC) |
| S | no | unknown | no | unknown | unknown | T, Tn, Te, Ten, Sr, S, I, Ig, Igp, In (& LPC) |
| I | no | n/a | no | n/a | unknown | M, Me, T, Tn, Te, Ten, Sr, S, I, Ig, Igp, In (& LPC) |

TABLE II-continued

| Cache state | HPC? | Unique? | Data source? | Consistent with LPC? | Cached outside local domain? | Legal concurrent states |
| --- | --- | --- | --- | --- | --- | --- |
| Ig | no | n/a | no | n/a | Assumed so, in absence of other information | M, Me, T, Tn, Te, Ten, Sr, S, I, Ig, Igp, In (& LPC) |
| Igp | no | n/a | no | n/a | Assumed so, in absence of other information | M, Me, T, Tn, Te, Ten, Sr, S, I, Ig, Igp, In (& LPC) |
| In | no | n/a | no | n/a | Assumed not, in absence of other information | M, Me, T, Tn, Te, Ten, Sr, S, I, Ig, Igp, In (& LPC) |

A. Ig State

In order to avoid having to access the LPC to determine whether or not the memory block is known to be cached, if at all, only locally, the Ig (Invalid global) coherency state is utilized to maintain a domain indication in cases in which no copy of a memory block remains cached in a coherency domain. The Ig state is defined herein as a cache coherency state indicating (1) the associated memory block in the cache array is invalid, (2) the address tag in the cache directory is valid, and (3) a copy of the memory block identified by the address tag may possibly be cached in a coherency domain other than the home coherency domain. The Ig indication is preferably imprecise, meaning that it may be incorrect without a violation of coherency.

The Ig state is formed in a lower level cache in the home coherency domain in response to that cache providing a requested memory block to a requester in another coherency domain in response to an exclusive access request (e.g., a bus RWITM operation).

Because cache directory entries including an Ig state carry potentially useful information, it is desirable in at least some implementations to preferentially retain entries in the Ig state over entries in the I state (e.g., by modifying the Least Recently Used (LRU) algorithm utilized to select a victim cache entry for replacement). As Ig directory entries are retained in cache, it is possible for some Ig entries to become "stale" over time in that a cache whose exclusive access request caused the formation of the Ig state may deallocate or writeback its copy of the memory block without notification to the cache holding the address tag of the memory block in the Ig state. In such cases, the "stale" Ig state, which incorrectly indicates that a global operation should be issued instead of a local operation, will not cause any coherency errors, but will merely cause some operations, which could otherwise be serviced utilizing a local operation, to be issued as global operations. Occurrences of such inefficiencies will be limited in duration by the eventual replacement of the "stale" Ig cache entries.

Several rules govern the selection and replacement of Ig cache entries. First, if a cache selects an Ig entry as the victim for replacement, a castout of the Ig entry is performed (unlike the case when an I, In or Igp entry is selected) in order to update the corresponding domain indicator 504 in system memory 108. Second, if a request that causes a memory block to be loaded into a cache hits on an Ig cache entry in that same cache, the cache treats the Ig hit as a cache miss and performs a castout operation with the Ig entry as the selected victim. The cache thus avoids avoid placing two copies of the same address tag in the cache directory. Third, the castout of the Ig state is preferably performed as a local-only operation limited in scope to the local coherency domain. Fourth, the castout of the Ig state is preferably performed as a dataless address-only operation in which the domain indication is written back to the domain indicator 504 in the LPC.

Implementation of an Ig state in accordance with the present invention improves communication efficiency by maintaining a cached domain indicator for a memory block in a home coherency domain even when no valid copy of the memory block remains cached in the home coherency domain. As described below, the cache domain indication provided by the Ig state can be utilized to predict a global broadcast scope on the interconnect fabric for operations targeting the associated memory block.

B. Igp State

The Igp (Invalid global predict-only) coherency state is utilized to maintain a cached domain indication in cases in which no copy of a memory block remains cached in a non-home coherency domain. The Igp state is defined herein as a cache coherency state indicating (1) the associated memory block in the cache array is invalid, (2) the address tag in the cache directory is valid, (3) the present coherency domain is not the home coherency domain, and (4) a copy of the memory block identified by the address tag may possibly be cached in a coherency domain other than the present non-home coherency domain. Although precisely formed, the Igp indication is preferably imprecisely maintained, meaning that it may be incorrect without a violation of coherency.

The Igp state is formed in a lower level cache in a non-home coherency domain in response to that cache providing coherency ownership of a requested memory block to a requestor in another coherency domain in response to an exclusive access request (e.g., a RWITM, DClaim, DCBZ, Kill, Write or Partial Write request).

Because cache directory entries including an Igp state carry potentially useful information, it is desirable in at least some implementations to preferentially retain entries in the Ig state over entries, if any, in the I state (e.g., by modifying the Least Recently Used (LRU) algorithm utilized to select a victim cache entry for replacement). As Igp directory entries are retained in cache, it is possible for some Igp entries to become "stale" over time in that a copy of the memory block may return to the coherency domain without snooping by the cache holding the address tag of the memory block in the Igp state. In such cases, the "stale" Igp state, which incorrectly indicates that a global operation should be issued instead of a local operation, will not cause any coherency errors, but will merely cause some operations, which could otherwise be serviced utilizing a local operation, to be issued as global operations. Occurrences of such inefficiencies will be limited in duration by the eventual replacement of the "stale" Igp cache entries.

In contrast to the handling of Ig entries, no castout of Igp entries is performed in response to selection of an Igp entry as the victim for replacement, for example, in accordance with a replacement algorithm (e.g., LRU) or because a request that causes a memory block to be loaded into a cache hits on an Igp cache entry in that same cache. Instead, the Igp entry is simply deallocated. No castout is performed because Igp entries do not maintain a cached and possibly modified copy of the underlying domain indicators 504.

Implementation of an Igp state in accordance with the present invention improves communication efficiency by maintaining a cached domain indicator for a memory block in a non-home coherency domain for scope prediction purposes even when no valid copy of the memory block remains cached in the non-home coherency domain.

C. In State

The In state is defined herein as a cache coherency state indicating (1) the associated memory block in the cache array is invalid, (2) the address tag in the cache directory is valid, and (3) a copy of the memory block identified by the address tag is likely cached, if at all, only by one or more other cache hierarchies within the local coherency domain. The In indication is preferably imprecise, meaning that it may be incorrect without a violation of coherency. The In state is formed in a lower level cache in response to that cache providing a requested memory block to a requestor in the same coherency domain in response to an exclusive access request (e.g., a bus RWITM operation).

Because cache directory entries including an In state carry potentially useful information, it is desirable in at least some implementations to preferentially retain entries in the In state over entries in the I state (e.g., by modifying the Least Recently Used (LRU) algorithm utilized to select a victim cache entry for replacement). As In directory entries are retained in cache, it is possible for some In entries to become "stale" over time in that a cache whose exclusive access request caused the formation of the In state may itself supply a shared copy of the memory block to a remote coherency domain without notification to the cache holding the address tag of the memory block in the In state. In such cases, the "stale" In state, which incorrectly indicates that a local operation should be issued instead of a global operation, will not cause any coherency errors, but will merely cause some operations to be erroneously first issued as local operations, rather than as global operations. Occurrences of such inefficiencies will be limited in duration by the eventual replacement of the "stale" In cache entries. In a preferred embodiment, cache entries in the In coherency state are not subject to castout, but are instead simply replaced. Thus, unlike Ig cache entries, In cache entries are not utilized to update domain indicators 504 in system memories 108.

Implementation of an In state in accordance with the present invention improves communication efficiency by maintaining a cached domain indicator for a memory block that may be consulted by a master in order to select a local scope for one of its operations. As a consequence, bandwidth on system interconnect 110 and local interconnects 114 in other coherency domains is conserved.

D. Sr State

In the operations described below, it is useful to be able to determine whether or not a lower level cache holding a shared requested memory block in the Sr coherency state is located within the same domain as the requesting master. In one embodiment, the presence of a "local" Sr snooper within the same domain as the requesting master can be indicated by the response behavior of a snooper at a lower level cache holding a requested memory block in the Sr coherency state. For example, assuming that each bus operation includes a range indicator indicating whether the bus operation has crossed a domain boundary (e.g., an explicit domain identifier of the master or a single local/not local range bit), a lower level cache holding a shared memory block in the Sr coherency state can provide a partial response affirming the request in the Sr state only for requests by masters within the same data sourcing domain and provide partial responses indicating the S state for all other requests. In such embodiments the response behavior can be summarized as shown in Table III, where prime (') notation is utilized to designate partial responses that may differ from the actual cache state of the memory block.

TABLE III

| Domain of master of read-type request | Cache state in directory | Partial response (adequate resources available) | Partial response (adequate resources unavailable) |
| --- | --- | --- | --- |
| "local" (i.e., within same domain) | Sr | Sr' affirm | Sr' possibly hidden |
| "remote" (i.e., not within same domain) | Sr | S' affirm | S' possibly hidden |
| "local" (i.e., within same domain) | S | S' affirm | S' possibly hidden |
| "remote" (i.e., not within same domain) | S | S' affirm | S' possibly hidden |

Assuming the response behavior set forth above in Table III, the average data latency for shared data can be significantly decreased by increasing the number of shared copies of memory blocks distributed within an SMP data processing system that may serve as data sources.

VII. Exemplary Exclusive Access Operation

Figure 6:
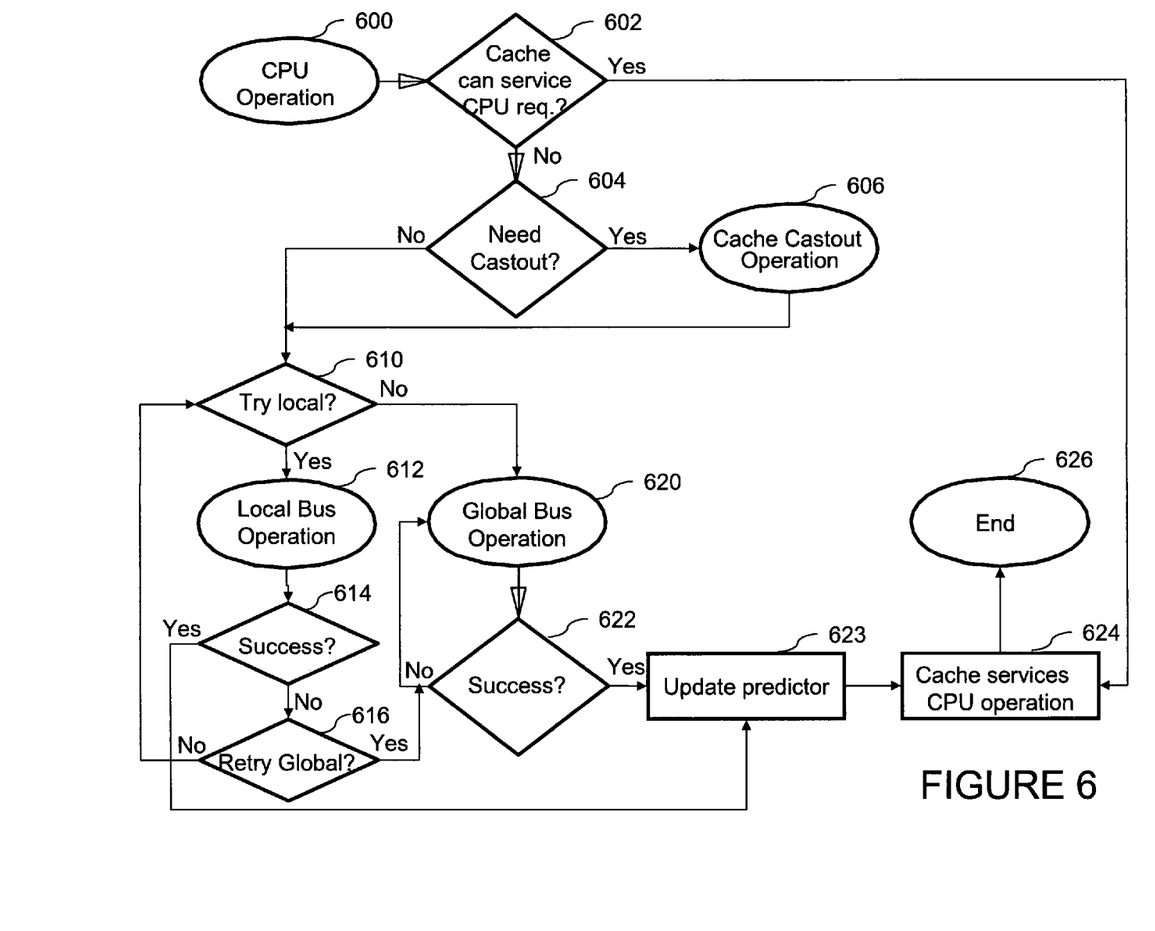
FIG. 6 is a high level logical flowchart of an exemplary method by which a cache memory services an operation received a processor core in a data processing system in accordance with the present invention.

With reference first to FIG. 6, there is depicted a high level logical flowchart of an exemplary method of servicing a processor (CPU) request in a data processing system in accordance with the present invention. As with the other logical flowcharts presented herein, at least some of the steps depicted in FIG. 6 may be performed in a different order than is shown or may be performed concurrently.

The process of FIG. 6 begins at block 600, which represents a master 232 in an L2 cache 230 receiving a CPU request (e.g., a CPU data load request, a CPU data store request, a CPU load-and-reserve request, a CPU instruction load request, etc.) from an associated processor core 200 in its processing unit 104. In response to receipt of the CPU request, master 232 determines at block 602 whether or not the target memory block, which is identified within the CPU request by a target address, is held in L2 cache directory 302 in a coherency state that permits the CPU request to be serviced without issuing a bus operation on the interconnect fabric. For example, a CPU instruction fetch request or data load request can be serviced without issuing a bus operation on the interconnect fabric if L2 cache directory 302 indicates that the coherency state of the target memory block is any of the M, Me, Tx (e.g., T, Tn, Te or Ten), Sr or S states. A CPU data store request can be serviced without issuing a bus operation on the interconnect fabric if L2 cache directory 302 indicates that the coherency state of the target memory block is one of the M or Me states. If master 232 determines at block 602 that the CPU request can be serviced without issuing a bus operation on the interconnect fabric, master 232 accesses L2 cache array 300 to service the CPU request, as shown at block 624. For example, master 232 may obtain a requested memory block and supply the requested memory block to the requesting processor core 200 in response to a CPU data load request or instruction fetch request or may store data provided in a CPU data store request into L2 cache array 300. Following block 624, the process terminates at block 626.

Returning to block 602, if the target memory block is not held in L2 directory 302 in a coherency state that permits the CPU request to be serviced without issuing a bus operation on the interconnect fabric, a determination is also made at block 604 whether or not a castout of an existing cache line is required to accommodate the target memory block in L2 cache 230. In one embodiment, a castout operation is required at block 604 if a memory block is selected for eviction from the L2 cache 230 of the requesting processor in response to the CPU request and is marked in L2 directory 302 as being in any of the M, T, Te, Tn or Ig coherency states. In response to a determination at block 604 that a castout is required, a cache castout operation is performed, as indicated at block 606. Concurrently, the master 232 determines at block 610 a scope of a bus operation to be issued to service the CPU request. For example, in one embodiment, master 232 determines at block 610 whether to broadcast a bus operation as a local operation or a global operation.

In a first embodiment in which each bus operation is initially issued as a local operation and issued as a local operation only once, the determination depicted at block 610 can simply represent a determination by the master of whether or not the bus operation has previously been issued as a local bus operation. In a second alternative embodiment in which local bus operations can be retried, the determination depicted at block 610 can represent a determination by the master of whether or not the bus operation has previously been issued more than a threshold number of times. In a third alternative embodiment, the determination made at block 610 can be based upon a prediction by the master 232 of whether or not a local bus operation is likely to be successful in resolving the coherency of the target memory block without communication with processing nodes in other coherency domains. For example, master 232 may select a local bus operation if the associated L2 cache directory 302 associates the target address with the In coherency state and may select a global bus operation if the associated L2 cache directory 302 associates the target address with the Ig or Igp coherency state.

In response to a determination at block 610 to issue a global bus operation rather than a local bus operation, the process proceeds from block 610 to block 620, which is described below. If, on the other hand, a determination is made at block 610 to issue a local bus operation, master 232 initiates a local bus operation on its local interconnect 114, as illustrated at block 612. The local bus operation is broadcast only within the local coherency domain (e.g., processing node 102) containing master 232. If master 232 receives a CR indicating "Success" (block 614), the process passes to block 623, which represents master 232 updating the predictor (e.g., coherency state or history-based predictor) utilized to make the scope selection depicted at block 610. In addition, master 232 services the CPU request, as shown at block 624. Thereafter, the process ends at block 626.

Returning to block 614, if the CR for the local bus read operation does not indicate "Success", master 232 makes a determination at block 616 whether or the CR is a "Retry Global" CR that definitively indicates that the coherency protocol mandates the participation of one or more processing nodes outside the local coherency domain and that the bus operation should therefore be reissued as a global bus operation. If so, the process passes to block 620, which is described below. If, on the other hand, the CR is a "Retry" CR that does not definitively indicate that the bus operation cannot be serviced within the local coherency domain, the process returns from block 616 to block 610, which illustrates master 232 again determining whether or not to issue a local bus operation to service the CPU request. In this case, master 232 may employ in the determination any additional information provided by the CR. Following block 610, the process passes to either block 612, which is described above, or to block 620.

Block 620 depicts master 230 issuing a global bus operation to all processing nodes 102 in data processing system in order to service the CPU request. If the CR of the global bus read operation does not indicate "Success" at block 622, master 232 reissues the global bus operation at block 620 until a CR indicating "Success" is received. If the CR of the global bus read operation indicates "Success", the process proceeds to block 623 and following blocks, which have been described.

Thus, assuming affinity between processes and their data within the same coherency domain, CPU requests can frequently be serviced utilizing broadcast communication limited in scope to the coherency domain of the requesting master or of other restricted scope less than a full global scope. The combination of data delivery domains as hereinbefore described and coherency domains thus improves not only data access latency, but also reduces traffic on the system interconnect (and other local interconnects) by limiting the scope of broadcast communication.

Figure 7A:
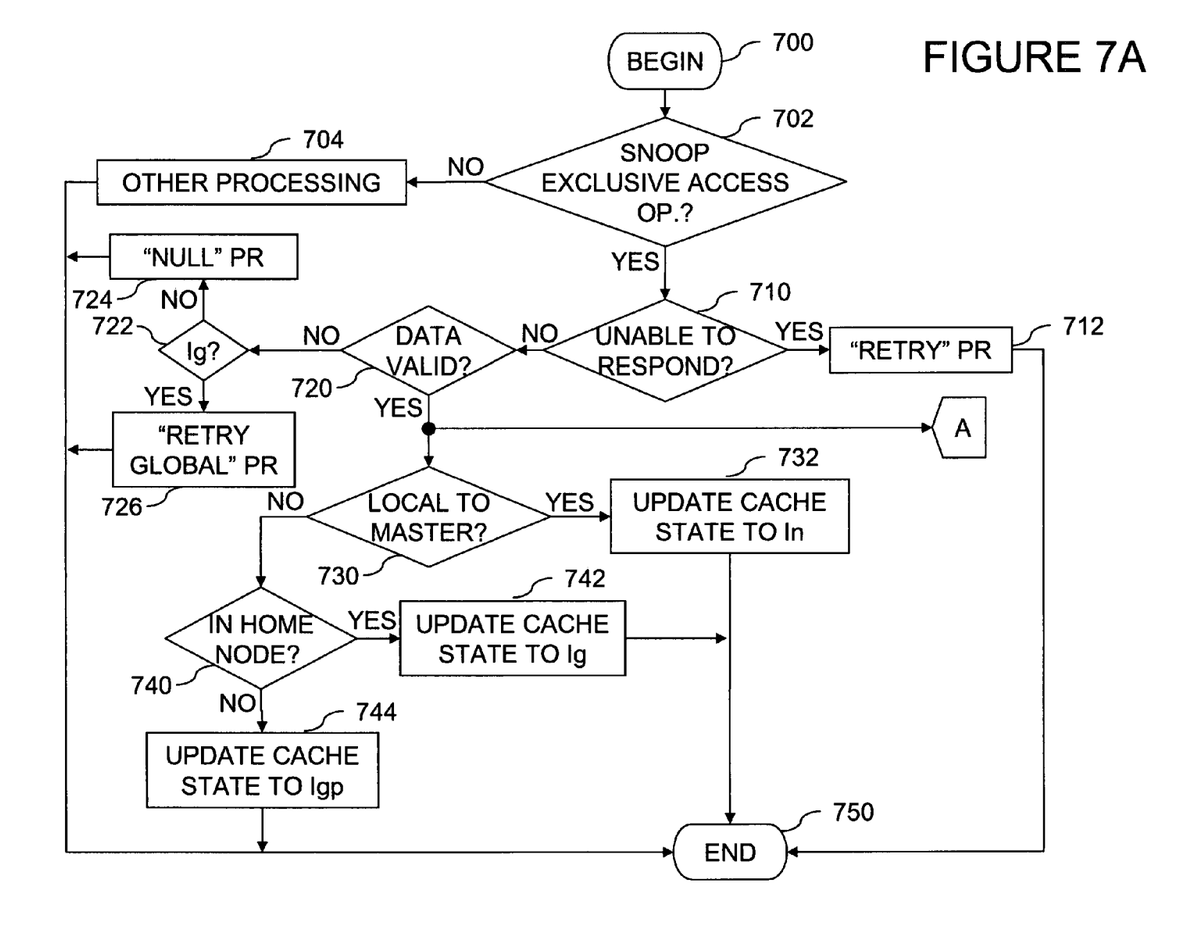
FIG. 7A-7B together form a high level logical flowchart of an exemplary method by which a cache snooper processes a storage modifying operation in accordance with the present invention.
Figure 7B:
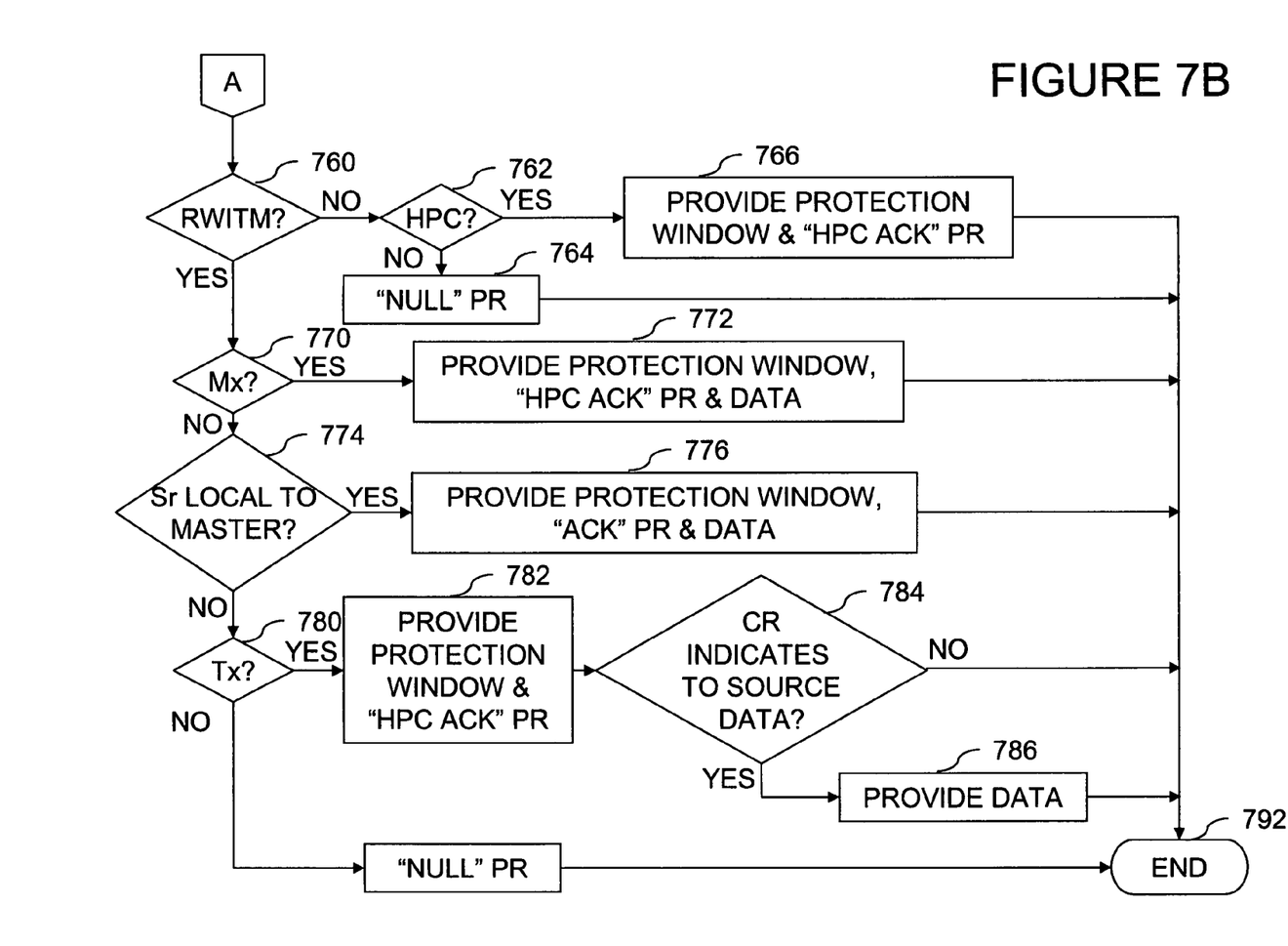

With reference now to FIGS. 7A-7B, there is depicted a high level logical flowchart of an exemplary method by which a cache snooper, such as an L2 cache snooper 236, processes a exclusive access operation (also referred to as a storage-modifying operation) in accordance with the present invention. Exclusive access requests include the RWITM, DClaim, DCBZ, Kill, Write and Partial Write operations described above.

As shown, the process begins at block 700 of FIG. 7A in response to receipt by an L2 cache snooper 236 of a request on its local interconnect 114. In response to receipt of the request, snooper 236 determines at block 702 whether or not the request is an exclusive access operation, for example, by reference to a transaction type (Ttype) field within the request. If not, snooper 236 performs other processing, as shown at block 704, and the process ends at block 750. If, however, snooper 236 determines at block 702 that the request is an exclusive access operation, snooper 236 further determines at block 710 whether or not it is presently able to substantively respond to the exclusive access operation (e.g., whether it has an available instance of snoop logic and current access to L2 cache directory 302). If snooper 236 is presently unable to substantively respond to the domain query request, snooper 236 provides a partial response (PR) indicating "retry", as depicted at block 712, and processing of the exclusive access operation ends at block 750.

Assuming that snooper 236 is able to substantively respond to the exclusive access operation, snooper 236 determines at block 720 whether or not the associated L2 cache directory 302 indicates a data-valid coherency state (e.g., Mx, Tx, Sr or S) for the memory block containing the target address. If not, the process passes to block 722, which depicts snooper 236 determining whether or not the coherency state for the memory block containing the target address is Ig. If so, snooper 236 resides in the home coherency domain (e.g., processing node 102) for the target address and accordingly provides a "Retry global" partial response indicating that a global operation will likely be required to service the exclusive access operation (block 726). If, on the other hand, the coherency state for the memory block containing the target address is not Ig, snooper 236 provides a "Null" partial response. Following either of blocks 724 or 726, the processing of the exclusive access operation by the snooper 236 terminates at block 750.

Returning to block 720, in response to a determination by snooper 236 that the associated L2 cache directory 302 indicates a data-valid state for the memory block containing the target address of the exclusive access operation, the process bifurcates and proceeds in parallel to block 730 and following blocks, which represent the coherency state update performed by snooper 236, and via page connector A to block 760 (FIG. 7B) and following blocks, which represent the data delivery and protection activities, if any, of snooper 236. Referring first to block 730, snooper 236 determines whether or not it resides within the same coherency domain as the device (e.g., L2 cache 230) that originally issued the exclusive access request. For example, snooper 236 may make the determination illustrated at block 730 by examining the range bit contained in the exclusive access operation. If snooper 236 determines at block 730 that it is within the same coherency domain as the device that initiated the exclusive access operation, snooper 236 updates the coherency state for the memory block containing the target address of the exclusive access operation to the In coherency state in its L2 cache directory 302. As noted above, the In coherency state provides an imprecise indication that the HPC for the memory block resides in the local (not necessarily home) coherency domain and that a subsequent local operation requesting the memory block may be successful.

If, on the other hand, snooper 236 determines at block 730 that it is within the same coherency domain as the device that initiated the exclusive access request, snooper 236 determines by reference to BAR logic 238 whether or not it is within the home coherency domain for the target memory block (block 740). If the snooper 236 determines at block 740 that it is within the home coherency domain of the target memory block, snooper 236 updates the coherency state of the target memory address to the Ig state within its L2 cache directory 302, as illustrated at block 742. If snooper 236 determines, however, that it is not in the home coherency domain of the target memory block, snooper 236 updates the coherency state of the target memory block to the Igp state (block 744). Following any of blocks 732, 742 and 744, the update to the coherency state in response to the exclusive access operation ends at block 750.

Referring now to FIG. 7B, the data delivery and protection activities, if any, of snooper 236 are depicted. As illustrated, snooper 236 determines at block 760 whether or not the snooped exclusive access operation is a RWITM operation, for example, by examining the Ttype specified by the operation. As indicated in Table I above, a RWITM operation is an exclusive access operation in which the initiator requests from another participant a unique copy of the image of a memory block with the intent to update (modify) it. If a determination is made at block 760 that the exclusive access operation is a RWITM operation, the process passes to block 770, which is described below. If not, the process proceeds to block 762, which depicts snooper 236 determining whether or not it is located at the HPC for the target memory block, for example, by reference to the coherency state of the target memory block in the associated L2 cache directory 302. In response to a determination at block 762 that snooper 236 is not located at the HPC for the target memory block of the exclusive access operation, snooper 236 generates or causes to be generated a "Null" partial response (block 764). However, in response to a determination at block 762 that the snooper 236 resides at the HPC, snooper 236 provides (or causes to be provided) an "HPC ack" partial response acknowledging that the initiator of the exclusive access operation has been selected as the new HPC for the target memory block and extends a protection window 404a to prevent other requestors from gaining coherency ownership of the memory block (block 766).

Referring now to block 770 and following blocks, snooper 236 responds to a RWITM operation based upon the coherency state of the target memory block in its associated L2 cache directory 302. In particular, if the coherency state of the target memory block in L2 cache directory 302 is Mx (e.g., M or Me), extends a protection window 404a to prevent other requesters from gaining ownership of the target memory block, provides an "HPC ack" partial response, and sources a copy of the memory block to the requester, as shown at blocks 770 and 772.

If, in the alternative, the coherency state of the target memory block in L2 cache directory 302 is Sr and snooper 236 is within the same data sourcing domain (e.g., processing node 102) as the requester, snooper 236 extends a protection window 404a, provides an "Ack" partial response, and sources a copy of the memory block to the requester, as shown at blocks 774 and 776. In the alternative, if the coherency state of the target memory block in L2 cache directory 302 is Tx (e.g., T, Te, Tn or Ten) as shown at block 780, snooper 236 extends a protection window 404a to prevent other requesters from gaining ownership of the target memory block and provides an "HPC Ack" partial response, as shown at block 782. In addition, as indicated at blocks 784 and 786, snooper 236 may source a copy of the target memory block to the requestor, depending upon the combined response received from response logic 210. That is, if the combined response indicates that this snooper 236 is responsible for sourcing a copy of the target memory block (e.g., no snooper 236 in the same coherency domain as the requester holds the target memory block in the Sr state), snooper 236 transmits a copy of the target memory block to the requester, as shown at block 786.

Referring again to block 780, in response to a negative determination snooper 236 simply provides a "Null" partial response, as shown at block 790. Following any of blocks 766, 764, 772, 776, 784, 786 and 790, the process ends at block 792.

As indicated above, at least one instance of response logic 210 (e.g., the response logic 210 in the initiating processing unit 104) combines partial responses generated by snoopers 236 and IMCs 206 in response to the exclusive access operation to determine the combined response for the exclusive access operation. As indicated in FIGS. 7A-7B, an individual snooper 236 of an exclusive access operation generally determines the update to its coherency state and its responsibility for data delivery and protection independently of the combined response. The notable exception to this general rule is that a snooper 236 having a locally cached Tx copy of the target memory block determines its responsibility for sourcing a copy of the target memory block in response to a RWITM operation by reference to the combined response, as described with reference to blocks 784-786 of FIG. 7B.

From the perspective of a master 232 that initiates an exclusive access operation, the combined response provides a great deal more relevant information. For example, the combined response preferably indicates: (1) whether the master gained coherency ownership of the target memory block (2) whether the exclusive access operation must be retried with an increased scope in order to gain coherency ownership of the target memory block, (3) if the exclusive access operation is a RWITM operation, which snooper is responsible for sourcing the target memory block, (4) whether background kill operations are required to invalidate non-HPC copies of the target memory block that may possibly remain, and (5) the scope of the required background kill operations, if any. The formation of the various combined responses from the partial responses of snoopers 236 and IMCs 206 is described in detail in U.S. patent application Ser. No. 11/055,305 (incorporated herein by reference) and accordingly not described herein in further detail.

As has been described, the present invention provides an improved data processing system, processing unit, cache hierarchy and method of data processing that provide an indication whether or not a memory block is likely to be cached inside or outside of a coherency domain. A domain indication provided in accordance with the present invention may be utilized to predict a scope of a broadcast operation targeting the associated memory block. The domain indication can advantageously be precisely formed in response to an exclusive access operation and independently of a combined response for the exclusive access operation, meaning that the tenure for which an instance of snooper logic must be active can terminate prior to receipt of the combined response. Also, an Igp domain indication need not be castout if deallocated, preserving bandwidth on the interconnect fabric.

While the invention has been particularly shown as described with reference to a preferred embodiment, it will be understood by those skilled in the art that various changes in form and detail may be made therein without departing from the spirit and scope of the invention.

What is claimed is:

1. A method of data processing in a cache coherent data processing system including at least first and second coherency domains, said method comprising:
   in a first cache memory within said first coherency domain of said data processing system, holding a memory block in a storage location associated with an address tag and a coherency state field;
   determining if a home system memory assigned an address associated with said memory block is within said first coherency domain, wherein said home system memory resides at a lowest level of a volatile memory hierarchy of the data processing system;
   in response to determining said home system memory is not within said first coherency domain, setting said coherency state field to a first coherency state that indicates that said address tag is valid, that said storage location does not contain valid data, that said first coherency domain does not contain said home system memory, and that, following formation of said first coherency state, said memory block is cached outside of said first coherency domain; and
   in response to determining that said home system memory is within said first coherency domain, setting said coherency state field to a second coherency state that indicates that said address tag is valid, that said storage location does not contain valid data, said first coherency domain contains said home system memory, and that, following formation of said second coherency state, said memory block is cached outside of said first coherency domain.

2. The method of claim 1, wherein said setting comprises setting said coherency state field to said first coherency state in response to an exclusive access request by a second cache memory in said second coherency domain of said data processing system.

3. The method of claim 2, wherein:
   said exclusive access request comprises a read-with-intent-to-modify (RWITM) operation; and
   said method further comprises said first cache memory sourcing said memory block to said second cache memory in said second coherency domain in response to said RWITM operation.

4. The method of claim 2, wherein said setting comprises setting said coherency state field to said first coherency state without first casting out said memory block to said home system memory of said memory block.

5. The method of claim 2, wherein said setting comprises updating said coherency state field to said first coherency state from a third coherency state indicating that said memory block is valid and modified with respect to a corresponding memory block within said home system memory.

6. The method of claim 1, and further comprising:
   said first cache memory predicting, by reference to said first coherency state, a scope of broadcast transmission including said second coherency domain; and
   said first cache memory issuing a broadcast operation of said predicted scope.

7. The method of claim 1, and further comprising said first cache memory deallocating an entry containing said address tag without performing a castout operation.

8. A cache memory for a cache coherent data processing system including at least first and second coherency domains each including at least one processing unit, wherein said first coherency domain includes the cache memory and said second coherency domain includes another coherent cache memory, said cache memory comprising:
   a cache controller;
   a data array including a data storage location for caching data; and
   a cache directory including:
      a tag field for storing an address tag in association with said data storage location; and
      a coherency state field associated with said tag field and said data storage location, wherein said coherency state field has a plurality of possible coherency states including a first coherency state and a second coherency state, wherein said first coherency state indicates that said address tag is valid, that said data storage location does not contain valid data, said first coherency domain does not contain a home system memory assigned a memory address identified by the address tag, and that, following formation of said first coherency state, a memory block corresponding to the memory address is cached outside of said first coherency domain, wherein the home system memory resides at a lowest level of a volatile memory hierarchy of the data processing system;
   wherein said second coherency state that indicates that said address tag is valid, that said storage location does not contain valid data, said first coherency domain contains said home system memory, and that, following formation of said second coherency state, said memory block is cached outside of said first coherency domain.

9. The cache memory of claim 8, wherein said cache controller sets said coherency state field to said first coherency state in response to an exclusive access request by said another cache memory in said second coherency domain of said data processing system and an indication that said home system memory is not within said first coherency domain.

10. The cache memory of claim 9, wherein:
said exclusive access request comprises a read-with-intent-to-modify (RWITM) operation; and
said cache memory sources said memory block to said another cache memory in said second coherency domain in response to said RWITM operation.

11. The cache memory of claim 9, wherein:
said cache controller sets said coherency state field to said first coherency state without first casting out said memory block to said home system memory.

12. The cache memory of claim 9, wherein:
said plurality of possible coherency states includes a third coherency state indicating that said memory block is valid and modified with respect to a corresponding memory block within said home system memory; and
said cache controller updates said coherency state field to said first coherency state from said third coherency state.

13. The cache memory of claim 8, wherein:
said cache controller sets said coherency state field to said second coherency state in response to receipt of an exclusive access operation from a requestor outside of said first coherency domain and an indication that said home system memory is outside said first coherency domain.

14. The cache coherent data processing system of claim 8, wherein:
said cache controller of said first cache memory predicts, by reference to said first coherency state, a scope of broadcast transmission including said second coherency domain and issues a broadcast operation of said predicted scope.

15. The cache memory of claim 8, wherein said cache controller of said first cache memory deallocates an entry containing said address tag without performing a castout operation.

16. A cache coherent data processing system, comprising:
at least one processor core; and
a cache memory in accordance with claim 8.

17. A cache coherent data processing system, comprising:
first and second coherency domains each including at least one processing unit, wherein said first coherency domain includes a first cache memory and said second coherency domain includes a coherent second cache memory and a home system memory assigned a memory address identified by an address tag;
wherein said first cache memory within said first coherency domain of said data processing system has a data storage location associated with an address tag field containing the address tag and a coherency state field;
wherein said coherency state field has a plurality of possible coherency states including a first coherency state and a second coherency state, wherein the first coherency state that indicates that said address tag is valid, that said data storage location does not contain valid data, said first coherency domain does not contain the home system memory assigned the memory address identified by the address tag, and that, following formation of said first coherency state, a memory block corresponding to the memory address is cached outside of said first coherency domain, wherein said home system memory resides at a lowest level of a volatile memory hierarchy of the data processing system; and
wherein said second coherency state that indicates that said address tag is valid, that said storage location does not contain valid data, said first coherency domain contains said home system memory, and that, following formation of said second coherency state, said memory block is cached outside of said first coherency domain.

\* \* \* \* \*